United States Patent
Kuo

(10) Patent No.: US 10,059,612 B2
(45) Date of Patent: Aug. 28, 2018

(54) WATER TREATMENT EQUIPMENT FOR RECIRCULATING AQUACULTURE

(71) Applicant: Chi-Tse Kuo, Taichung (TW)

(72) Inventor: Chi-Tse Kuo, Taichung (TW)

( * ) Notice: Subject to any disclaimer, the term of this patent is extended or adjusted under 35 U.S.C. 154(b) by 0 days.

(21) Appl. No.: 15/246,544

(22) Filed: Aug. 25, 2016

(65) Prior Publication Data

US 2016/0362322 A1 Dec. 15, 2016

Related U.S. Application Data

(63) Continuation-in-part of application No. 14/317,803, filed on Jun. 27, 2014, now abandoned.

(51) Int. Cl.
*A01K 63/04* (2006.01)
*C02F 1/24* (2006.01)
(Continued)

(52) U.S. Cl.
CPC ............... *C02F 9/00* (2013.01); *A01K 63/00* (2013.01); *A01K 63/04* (2013.01); *A01K 63/042* (2013.01); *A01K 63/045* (2013.01); *A01K 63/047* (2013.01); *C02F 1/24* (2013.01); *C02F 1/283* (2013.01); *C02F 1/325* (2013.01); *C02F 1/444* (2013.01); *C02F 1/78* (2013.01); *C02F 3/06* (2013.01); *C02F 3/104* (2013.01); (Continued)

(58) Field of Classification Search
CPC .... C02F 9/00; C02F 1/24; C02F 3/302; C02F 3/341; C02F 1/325; C02F 1/78; C02F 1/283; C02F 2103/20; C02F 1/444; C02F 3/06; C02F 3/303; C02F 3/104; C02F 3/106; C02F 2303/04; A01K 63/045; A01K 63/042; A01K 63/047; A01K 63/04; A01K 63/00; Y02W 10/15
USPC ....... 210/167.22, 167.26, 903, 905; 119/259, 119/260, 261
See application file for complete search history.

(56) References Cited

U.S. PATENT DOCUMENTS 5,228,999 A * 7/1993 Yang .................... A01K 63/045
119/260
5,240,596 A * 8/1993 Chesnut ................ A01K 63/10
119/232

(Continued)

OTHER PUBLICATIONS

Machine-generated English Translation of CN 102874922, generated on Mar. 19, 2018.*

*Primary Examiner* — Fred Prince

(57) ABSTRACT

Water treatment equipment for recirculating aquaculture contains: at least one aquaculture tank, an aeration unit, at least one water circulating tank, a plurality of membrane filtering units and a water returning unit. Each aquaculture tank includes plural connecting plate units and a flowing cup; the aeration unit includes a plurality of air supply pipes. Each water circulating tank includes a nitration reacting chamber and an accommodating chamber, and the nitration reacting chamber has a flow tube outwardly extending to the flowing cup and a nitrifying bacteria layer fixed therein. Each membrane filtering unit is a circularly flat membrane and includes a water pipe and plural disc-shaped film bags, wherein each film bag has two filtering films communicating with the water pipe; and the water returning unit is fixed outside each aquaculture tank and includes a pump and a water return tube.

1 Claim, 10 Drawing Sheets

(51) Int. Cl.

| | | |
|---|---|---|
| *C02F 3/30* | (2006.01) | |
| *C02F 3/10* | (2006.01) | |
| *C02F 1/32* | (2006.01) | |
| *C02F 1/78* | (2006.01) | |
| *C02F 1/28* | (2006.01) | |
| *C02F 9/00* | (2006.01) | |
| *A01K 63/00* | (2017.01) | |
| *C02F 3/34* | (2006.01) | |
| *C02F 103/20* | (2006.01) | |
| *C02F 1/44* | (2006.01) | |
| *C02F 3/06* | (2006.01) | |

(52) U.S. Cl.
CPC .............. *C02F 3/106* (2013.01); *C02F 3/302* (2013.01); *C02F 3/303* (2013.01); *C02F 3/341* (2013.01); *C02F 2103/20* (2013.01); *C02F 2303/04* (2013.01); *Y02W 10/15* (2015.05)

(56) References Cited

U.S. PATENT DOCUMENTS

| | | | | |
|---|---|---|---|---|
| 5,961,831 A | * | 10/1999 | Lee | A01K 63/042 |
| | | | | 119/204 |
| 6,382,134 B1 | * | 5/2002 | Gruenberg | A01K 63/04 |
| | | | | 119/215 |
| 2009/0200218 A1 | * | 8/2009 | Newman | A01K 63/045 |
| | | | | 210/188 |
| 2011/0039321 A1 | * | 2/2011 | Tal | C02F 3/2806 |
| | | | | 435/167 |
| 2015/0041376 A1 | * | 2/2015 | Fulford | C02F 3/103 |
| | | | | 210/143 |
| 2015/0373954 A1 | * | 12/2015 | Kuo | C02F 1/24 |
| | | | | 210/151 |

\* cited by examiner

WATER TREATMENT EQUIPMENT FOR RECIRCULATING AQUACULTURE

This application is a Continuation-in-Part of application Ser. No. 14/317,803, filed on Jun. 27, 2014.

BACKGROUND OF THE INVENTION

Field of the Invention

Description of the Prior Art

A conventional aquaculture in a fish pond is limited because of land subsidence resulting from over-pumping of groundwater, so closed recirculating aquaculture system is developed. For example, such an aquaculture system contains an aquaculture tank in which aquaculture water is fed, an aeration apparatus fixed in the tank to supply oxygen, and a discharging tube mounted on a bottom end thereof and connecting with a water purification device, such that the aquaculture water is filtered by the water purification device and flows back to the aquaculture tank, thus recycling the aquaculture water effectively.

However, the recirculating aquaculture system still has defects as follows:

1. Baits and feeding are fed into the aquaculture tank, residual feeding and excreta deposit in the aquaculture tank accordingly to increase nitrite and ammonia concentration, thus eutrophicating and polluting the aquaculture water.

2. The aquaculture tank is made of cement or stainless steel, so it is in a fixed size and cannot be portable.

3. The aquaculture tank has to be cleaned periodically so as to prevent breeding of bacteria and algae, but it cannot be removed for easy cleaning.

4. The water purification device has to match with multi-stage processing, for instance, filtering solid granules with a large diameter in a sand filtration manner, eliminating ammonia and organic in aquaculture water in a biological treatment manner, filtering suspended particles and sludge in the aquaculture water by using microporous material, adding medicinal agent to sterilize bacteria, flowing the aquaculture water to a salt groove to adjust PH value, and then circulating the aquaculture water into the t aquaculture tank after aeration. Therefore, the water purification device occupies large configuration space and causes expensive using cost.

5. The filtering material has to be replaced regularly to have high replacement cost.

The present invention has arisen to mitigate and/or obviate the afore-described disadvantages.

SUMMARY OF THE INVENTION

The primary object of the present invention is to provide water treatment equipment for recirculating aquaculture which supplies aeration and sufficient dissolved oxygen in each aquaculture tank, and floats residual feeding and excreta upwardly so that the residual feeding and the excreta further flow out of each aquaculture tank, thus enhancing aquaculture density and survival rate.

Further object of the present invention is to provide water treatment equipment for recirculating aquaculture in which each aquaculture tank is connected quickly by the plural connecting plate units so that each aquaculture tank is assembled quickly and is portable and cleaned easily.

Another object of the present invention is to provide treatment equipment for recirculating aquaculture in which each aquaculture tank is integrated with biological treatment and membrane filtering device to reduce a configuration space of the water treatment equipment.

To obtain the above objectives, treatment equipment for recirculating aquaculture provided by the present invention contains: at least one aquaculture tank, an aeration unit, at least one water circulating tank, a plurality of membrane filtering units and a water returning unit.

Each aquaculture tank is removable and includes plural connecting plate units connected together to form an octagonal hollow tank, and each aquaculture tank also includes a flowing cup.

The aeration unit includes a plurality of air supply pipes arranged on a bottom end of each aquaculture tank to input exterior air into water for having aeration, maintaining dissolved oxygen and producing tiny air bubbles, such that residual feeding and excreta in each aquaculture tank float upwardly and then flow out of each aquaculture tank via the flowing cup.

Each water circulating tank is removable and is disposed on a first side of each aquaculture tank proximate to the flowing cup, and each water circulating tank includes a nitration reacting chamber defined on a bottom end thereof and an accommodating chamber arranged above the nitration reacting chamber, the nitration reacting chamber has a flow tube outwardly extending to the flowing cup and a nitrifying bacteria layer fixed therein, such that the water flows into the nitration reacting chamber through the flow tube to be nitrified/denitrified by nitrosomonas and denitrifying bacteria in the nitrifying bacteria layer, thus removing ammonia, nitrate and nitrite in the water.

The plurality of membrane filtering units are arranged in the accommodating chamber, and each membrane filtering unit is a circularly flat membrane and includes a water pipe and plural disc-shaped film bags tightly inserted on the water pipe, wherein each film bag has two filtering films communicating with the water pipe.

The water returning unit is fixed outside each aquaculture tank and includes a pump joined with one end of the water pipe and a water return tube connected with an outlet end of the pump, the water return tube extends to each aquaculture tank, and the water is pumped backed to each aquaculture tank via the water pipe and the water return tube, thus forming recycled water.

DETAILED DESCRIPTION OF THE PREFERRED EMBODIMENTS

Figure 1:
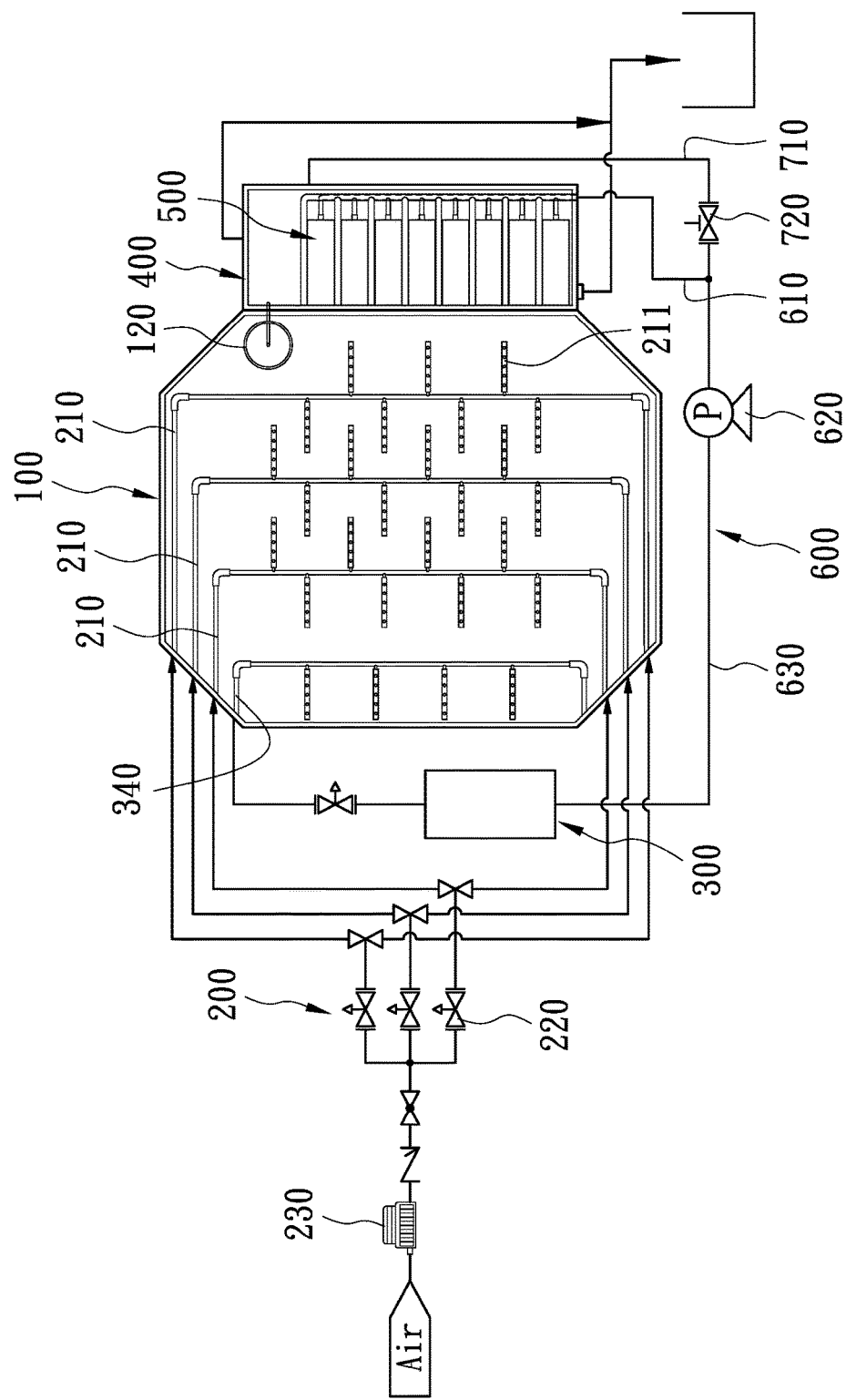
FIG. 1 is a diagram showing the assembly of water treatment equipment for recirculating aquaculture according to a first embodiment of the present invention.
Figure 5:
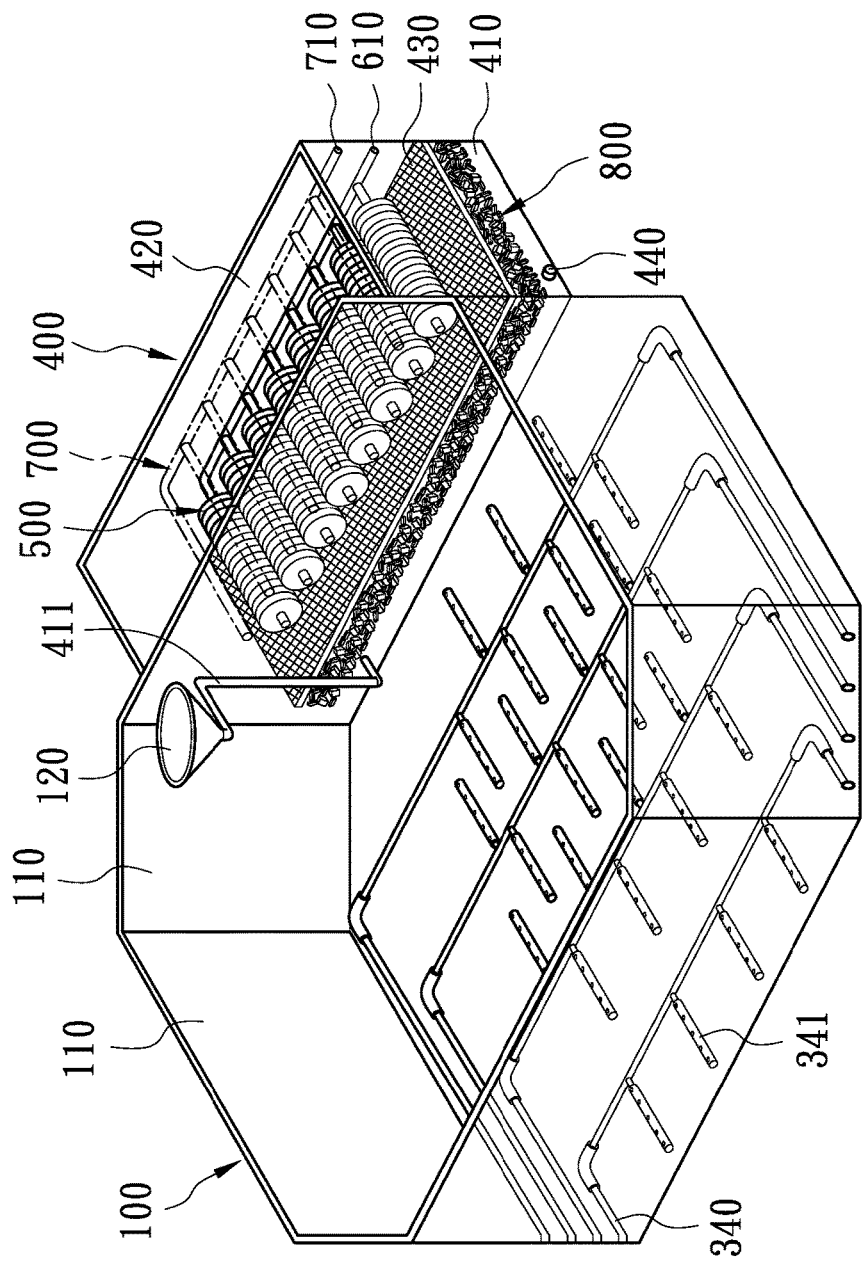
FIG. 5 is a perspective view showing the assembly of the aquaculture tank and the water circulating tank of the water treatment equipment for the recirculating aquaculture according to the first embodiment of the present invention.

With reference to FIGS. 1 and 5, water treatment equipment for recirculating aquaculture according to a preferred embodiment of the present invention comprises: at least one aquaculture tank 100, an aeration unit 200, a sterilization unit 300, at least one water circulating tank 400, a plurality of membrane filtering units 500, a water returning unit 600, and a spraying unit 700.

Figure 2:
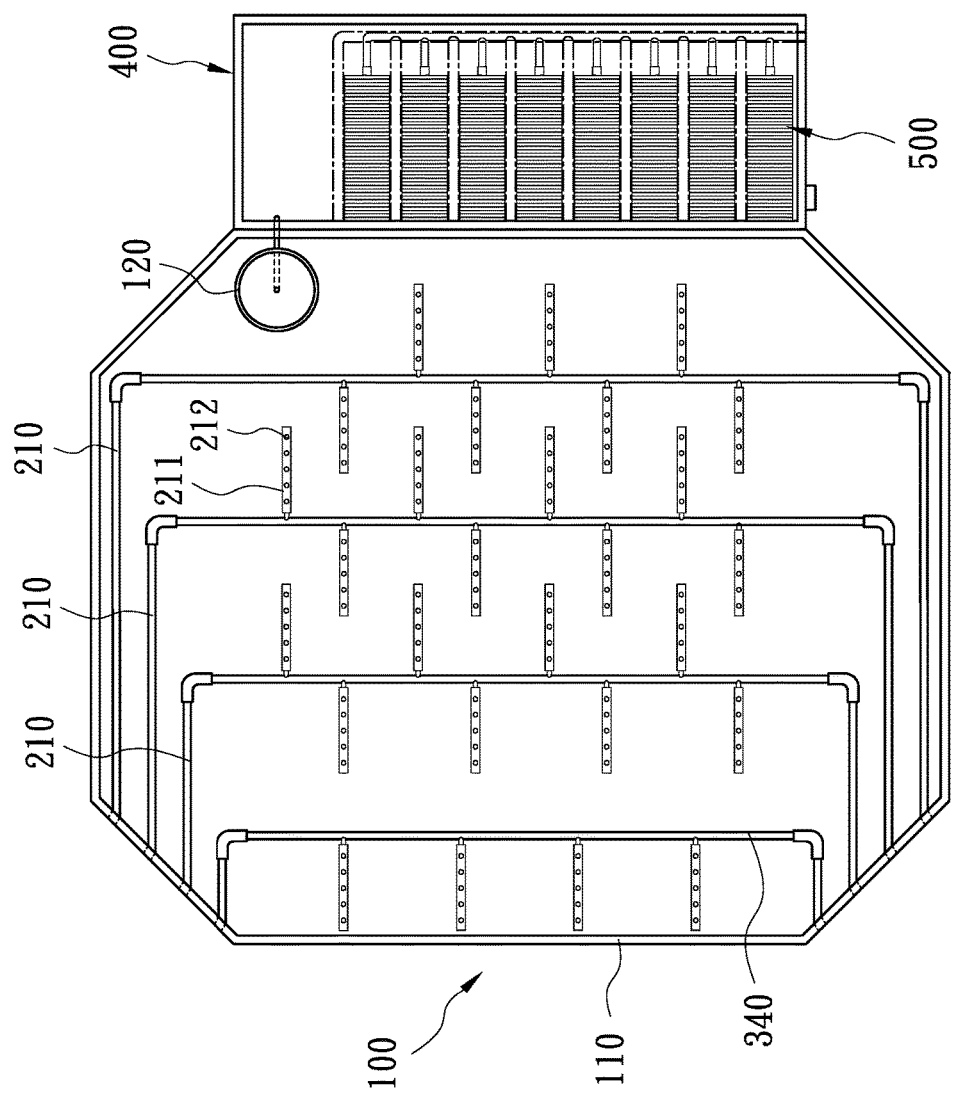
FIG. 2 is a top plan view showing the assembly of an aquaculture tank and a water circulating tank of the water treatment equipment for the recirculating aquaculture according to the first embodiment of the present invention.
Figure 3:
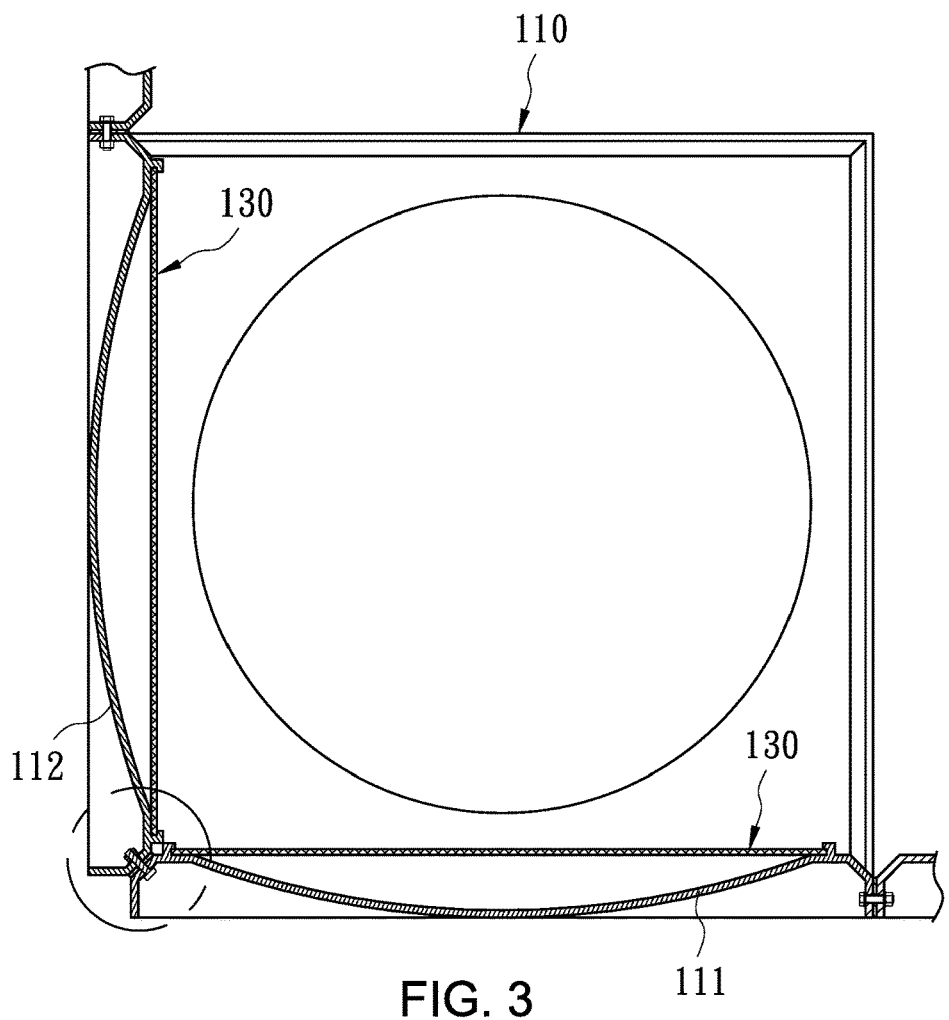
FIG. 3 is a cross sectional view showing the assembly of a part of a connecting plate unit of the aquaculture tank according to the first embodiment of the present invention.
Figure 4:
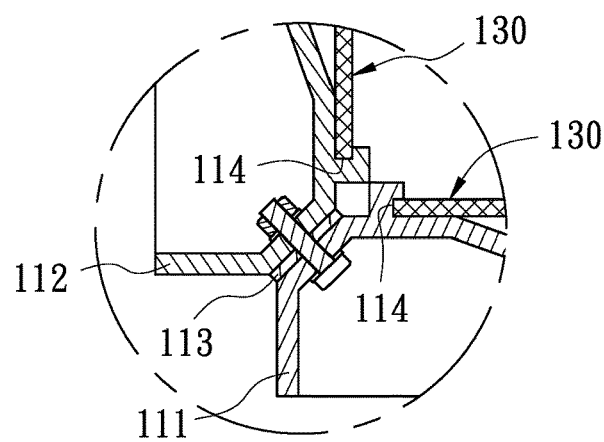
FIG. 4 is an amplified cross sectional view of a portion marked by an imaginary line of FIG. 3.

Referring to FIGS. 2 to 4, each aquaculture tank 100 is removable and is employed to hold treated aquaculture water. Each aquaculture tank 100 includes plural connecting plate units 110 connected together to form an octagonal hollow tank, such that the treated aquaculture water flows circulatively in each aquaculture tank 100. To lower mold manufacturing cost, each connecting plate unit 110 has a first plate 111 and a second plate 112 which are manufactured in a predetermined proportion and are coupled together. Each connecting plate unit 110 also includes a watertight strip 113 defined between the first plate 111 and the second plate 112 to prevent water leakage. In this embodiment, each of the first plate 111 and the second plate 112 is hollow and is made of glass fiber-reinforced polymer (FRP) material to reduce its weight, thus obtaining easy delivery, assembly and disassembly. Preferably, each aquaculture tank 100 also includes a funnel-shaped flowing cup 120 adjacent to one of the plural connecting plate units 110, and a height of the flowing cup 120 is higher than a level of the treated aquaculture water.

Each of the first plate 111 and the second plate 112 has a retaining slot 114 formed on an inner wall thereof to retain an antibacterial material layer 130, and the antibacterial material layer 130 is a stainless steel mesh made of silver, copper, cobalt and titanium dioxide ($TiO_2$) to reinforce impact strength and to enhance antimicrobial effect and corrosion resistance. Preferably, the antibacterial material layer 130 is removed from the retaining slot 114 easily for cleaning.

As shown in FIGS. 1 and 2, the aeration unit 200 includes a plurality of air supply pipes 210 arranged on a bottom end of each aquaculture tank 100, plural air control valves 220 communicating with the plurality of air supply pipes 210, and a blower 230 coupled with the plural air control valves 220. In this embodiment, there are three air supply pipes 210 in a horseshoe shape parallelly arranged on the bottom end of each aquaculture tank 100, and each air supply pipe 210 has plural branch pipes 211 extending outwardly from two sides thereof, and each branch pipe 211 has a plurality of air holes 212, hence each aquaculture tank 100 includes an air supply structure formed on the bottom end thereof. Furthermore, each air control valve 220 is joined with an external water detecting system (not shown) to adjust air flow from each air supply pipe 210, thus supplying sufficient dissolved oxygen in each aquaculture tank 100.

Figure 7:
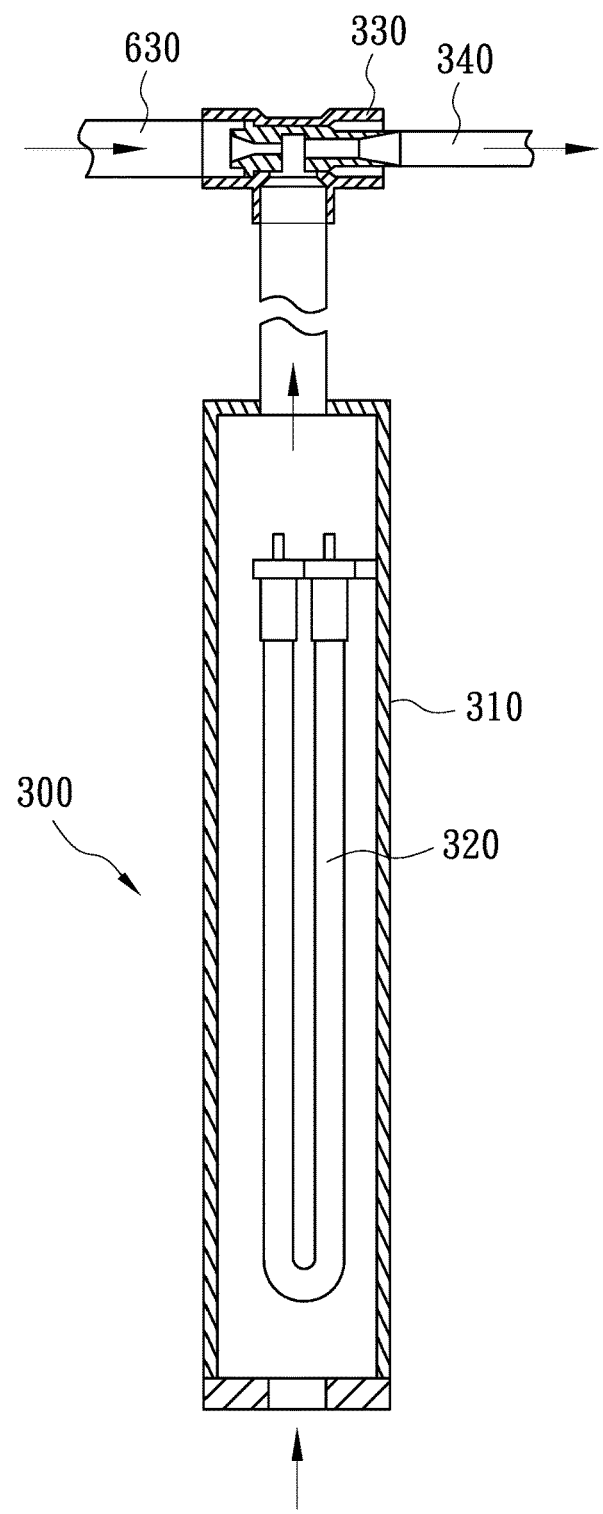
FIG. 7 is a cross sectional view showing the assembly of a sterilization unit of the water treatment equipment for the recirculating aquaculture according to the first embodiment of the present invention.

As illustrated in FIGS. 1 and 7, the sterilization unit 300 is mounted on a first side of each aquaculture tank 100 and includes a housing 310, at least one UV light source 320 fixed in the housing 310, a suction valve 330 connecting with the at least one UV light source 321, and an ozone supply tube 340 extending into the bottom end of each aquaculture tank 100. In this embodiment, the ozone supply tube 340 has plural branch tubes 341 (as shown in FIG. 5) arranged on one side of the flowing cup 120 so that ozone flows with the treated aquaculture water widely, and the at least one UV light source 320 illuminates the air to produce the ozone in each aquaculture tank 100, thus avoiding proliferation of bacteria and viruses in the treated aquaculture water.

Each water circulating tank 400 is removable and is disposed on a second side of each aquaculture tank 100 proximate to the flowing cup 120. Said each water circulating tank 400 includes a nitration reacting chamber 410 defined on a bottom end thereof, an accommodating chamber 420 arranged above the nitration reacting chamber 410, and a stopping layer 430 defined between the nitration reacting chamber 410 and the accommodating chamber 420. The nitration reacting chamber 410 has a flow tube 411 outwardly extending to a bottom end of the flowing cup 120 and has a nitrifying bacteria layer 800 fixed therein.

The nitrifying bacteria layer 800 is filled in a mesh bag and has nitrosomonas, denitrifying bacteria, and actived carbon which are mixed together, and porous solidified granules made of high polymer, such that the nitrosomonas has high density and maintains in the nitrifying bacteria layer 800 for a long time, thus reducing environmental sensitivity, facilitating solid-liquid separation and sludge elimination, and lowering material consumption (e.g., only extra 20% of nitrifying bacteria layer 800 is refilled ever year).

Figure 8:
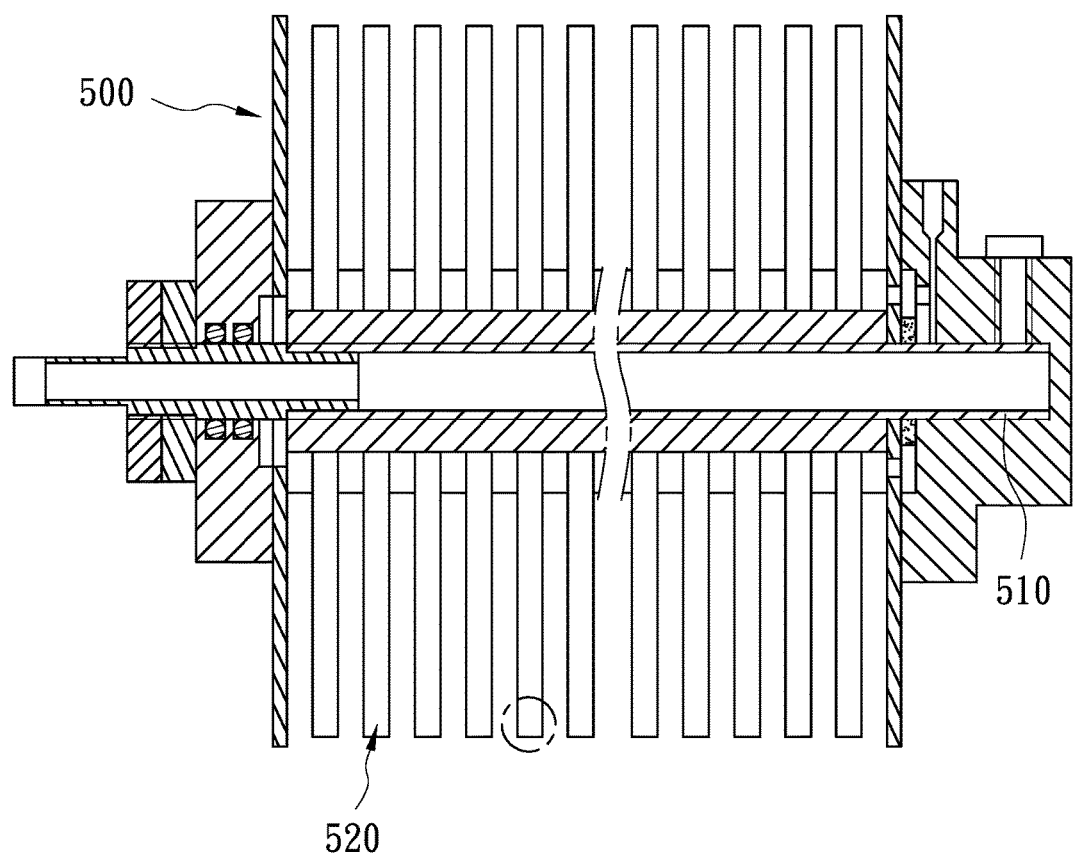
FIG. 8 is a cross sectional view showing the assembly of a membrane filtering unit of the water treatment equipment for the recirculating aquaculture according to the first embodiment of the present invention.
Figure 9:
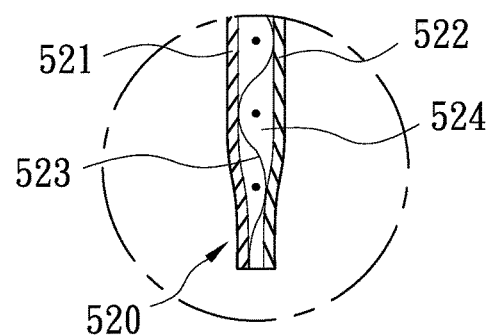
FIG. 9 is a cross sectional view showing the assembly of two film bags of the water treatment equipment for the recirculating aquaculture according to the first embodiment of the present invention.

With reference to FIGS. 5 and 8, the plurality of membrane filtering units 500 are parallelly and equidistantly arranged in the accommodating chamber 420, and each membrane filtering unit 500 is a circularly flat membrane and includes a water pipe 510 and plural disc-shaped film bags 520 tightly inserted on the water pipe 510, wherein each film bag 520 has two filtering films 521, 522 and a support net 523 defined between the two filtering films 521, 522, the two filtering films 521, 522 and the support net 523 are one piece welded in a high frequency welding manner, such that a channel 524 (as illustrated in FIG. 9) is formed between the two filtering films 521, 522 and communicates with the water pipe 510. In this embodiment, the two filtering films 521, 522 are a UF membrane disclosed in TW Patent No. I318133, so further remarks are omitted.

As shown in FIGS. 1, 5 and 7, the water returning unit 600 is fixed outside each aquaculture tank 100 and includes a collecting tube 610 coupled with a distal end of the water pipe 510 of each membrane filtering unit 500 to deliver filtrate water, a pump 620 joined with a distal end of the collecting tube 610, and a water return tube 630 connected with an outlet end of the pump 620. One end of the water return tube 630 is in connection with the suction valve 330 of the sterilization unit 300 so that the ozone is drawn into the treated aquaculture water in the water return tube 630 by ways of the suction valve 330, and then the treated aquaculture water is pumped backed to each aquaculture tank 100, thereby achieving antibacterial and deodorizing effect.

Figure 6:
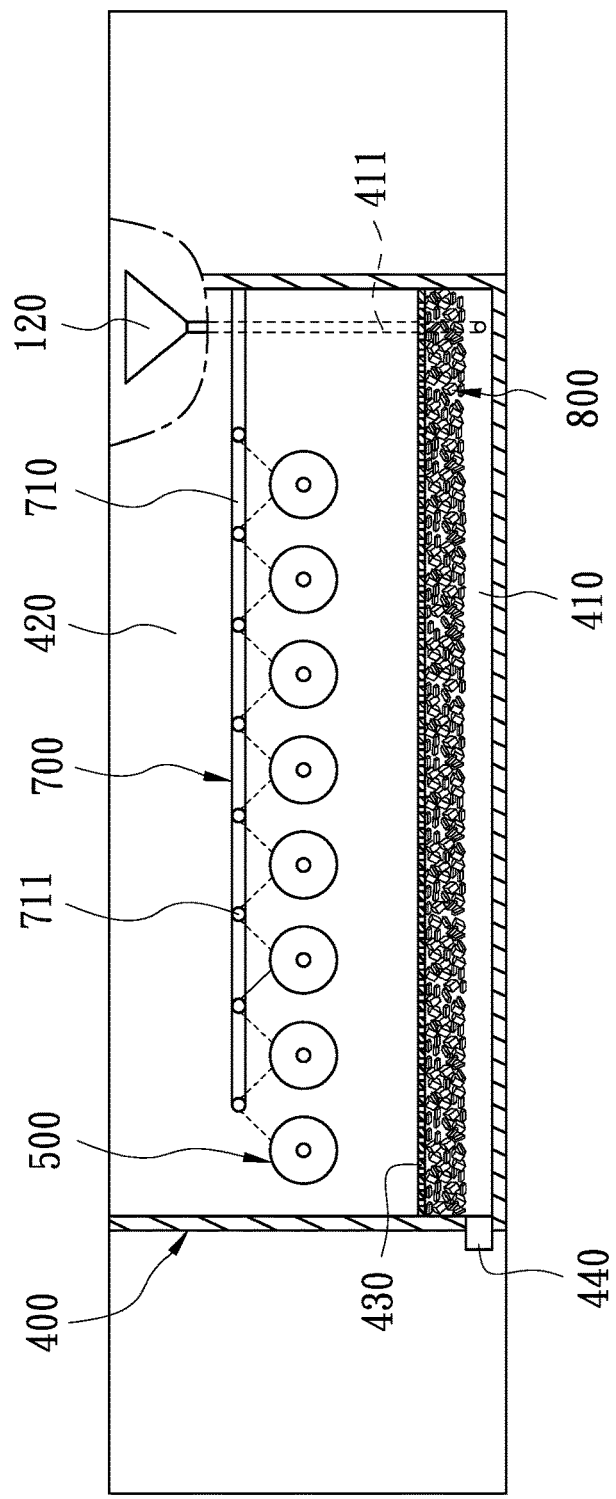
FIG. 6 is a cross sectional view showing the assembly of the water circulating tank of the water treatment equipment for the recirculating aquaculture according to the first embodiment of the present invention.

As illustrated in FIGS. 1, 5 and 6, the spraying unit 700 is mounted above the plurality of membrane filtering units 500 and includes a backwash pipe 710 communicating with the water return tube 630 and a controlling valve 720 connecting with the backwash pipe 710, wherein the backwash pipe 710 has a plurality of spray heads 711 for corresponding to the plurality of membrane filtering units 500.

After the aeration unit 200 are actuated by the blower 230, tiny air bubbles are inputted into the treated aquaculture water in each aquaculture tank 100 from an air duct to have air aerating and oxygen dissolving process, and residual feeding and excreta in each aquaculture tank 100 float upwardly and then flow out of each aquaculture tank 100 via the flowing cup 120. Thereafter, the treated aquaculture water flows into the nitration reacting chamber 410 through the flow tube 411 to be nitrified/denitrified (such a prior art is disclosed in CN102874922A, so further remarks are omitted) by the nitrifying bacteria layer 800, thus removing ammonia, nitrate and nitrite in the treated aquaculture water. In the meantime, a vacuum suction of the pump 620 of the water returning unit 600 drives the treated aquaculture water in the accommodating chamber 420 to be separated into solids and liquids by means of a vacuum pressure difference, and each film bag 520 with 0.03 μm aperture diameter filters viruses, bacteria, sodium hypochlorite, sludge and insoluble solids, then the liquids are pumped back to each aquaculture tank 100 via the water pipe 510, the collecting tube 610, the water return tube 630, and the ozone supply tube 340, thus recycling the treated aquaculture water.

Moreover, the residual feeding and the sludge in the nitration reacting chamber 410 are discharged out of a discharging outlet 440 of said each water circulating tank 400 and are concentrate by recycling equipment (such as a pressure filter or a filter) to produce concentrated water as organic fertilizer, and supernatant liquid on the concentrated water is recycled back to a water storage tank.

When each film bag 520 attaches the sludge and solid particles, the pump 620 is turned off, and the controlling valve 720 of the spraying unit 700 is started so that the backwash pipe 710 guides recycled water in the water return tube 630, and the plurality of spray heads 711 spray water to clean each film bag 520 as shown in FIG. 6. Preferably, the water for cleaning each film bag 520 is discharged out of the accommodating chamber 420.

Figure 10:
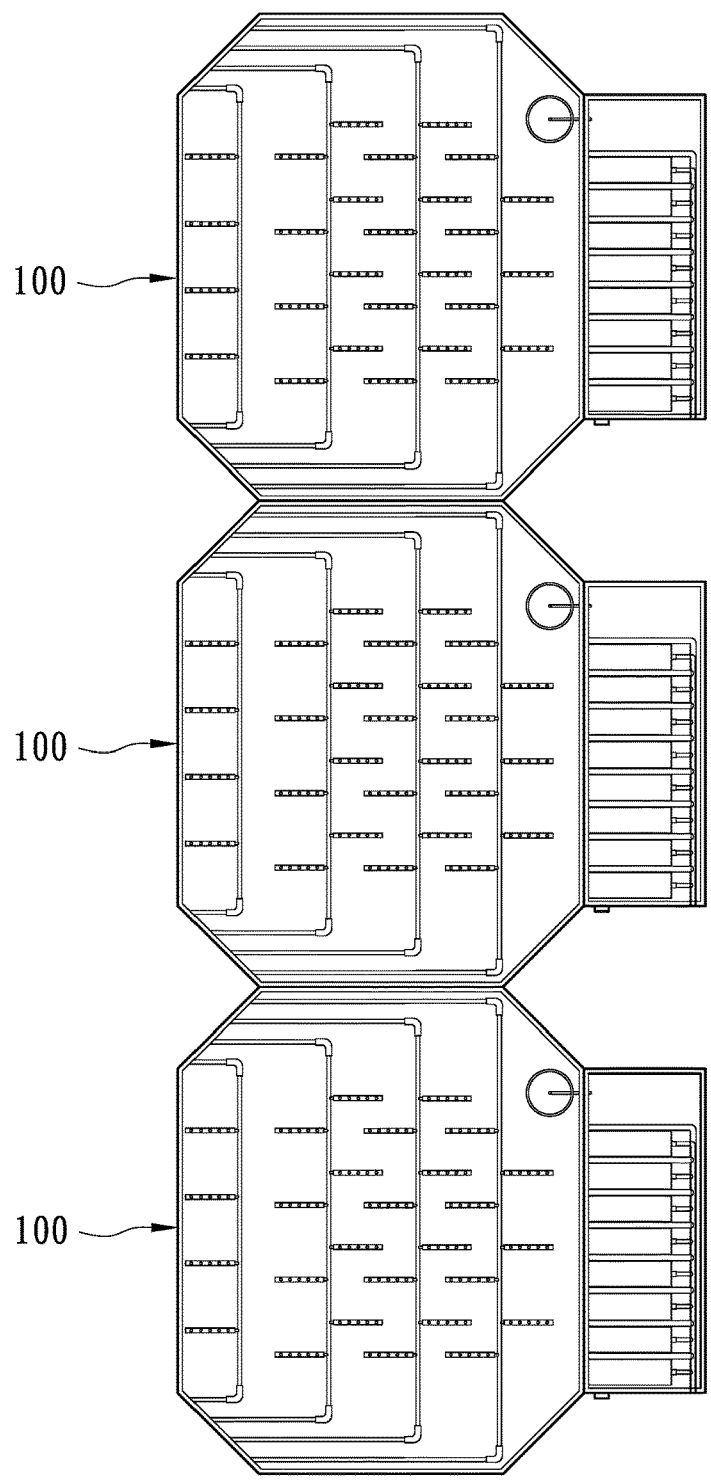
FIG. 10 is a diagram showing plural aquaculture tanks of the water treatment equipment for the recirculating aquaculture being connected together according to the first embodiment of the present invention.

As illustrated in FIG. 10, a plurality of aquaculture tanks 100 (i.e., three aquaculture tanks 100) are connected together to increase aquaculture space.

Accordingly, the water treatment equipment of the present invention has following advantages:

1. The water treatment equipment supplies sufficient dissolved oxygen and flows the residual feeding and the excreta out of each aquaculture tank 100. Preferably, the sterilization unit 300 provides the ozone to avoider the proliferation of bacteria and viruses in the treated aquaculture water, thus enhancing aquaculture density and survival rate.

2. Said each aquaculture tank 100 and said each water circulating tank 400 are connected quickly by the plural connecting plate units 110 in the predetermined proportion, and they are portable easily.

3. The plural connecting plate units 110 of each aquaculture tank 100 are removable to clean the antibacterial material layer 130, thereby preventing the proliferation of bacteria and viruses.

4. Due to biological treatment and membrane filtering device are integrated in said each water circulating tank 400, and said each water circulating tank 400 is joined with each aquaculture tank 100, a configuration space of the water treatment equipment is reduced.

5. Each film bag 520 is cleaned periodically to prolong its service life and to save using cost.

6. In denitrifying and membrane filtrating treatment of said each water circulating tank 400, only one pump 620 is required, so the treated aquaculture water is pumped backed to each aquaculture tank 100, thereby achieving antibacterial effect and environmental protection.

Figure 11:
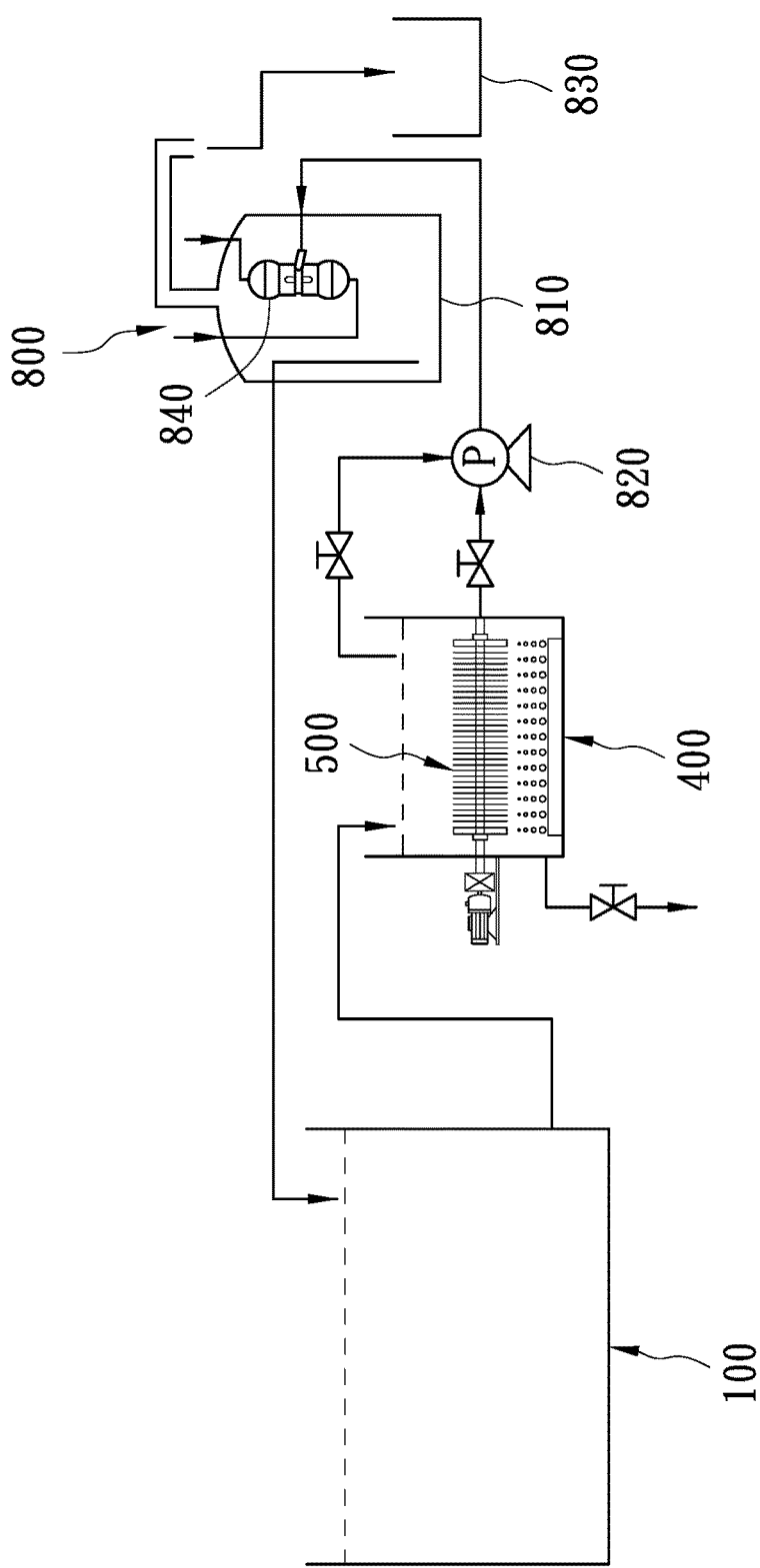
FIG. 11 is a diagram showing the assembly of water treatment equipment for recirculating aquaculture according to a second embodiment of the present invention.

With reference to FIG. 11, water treatment equipment for recirculating aquaculture according to a second embodiment of the present invention comprises: at least one aquaculture tank 100, at least one water circulating tank 400, a plurality of membrane filtering units 500, and at least one protein skimmer 800. Since the at least one aquaculture tank 100, the at least one water circulating tank 400, and the plurality of membrane filtering units 500 are identical to those of the first embodiment, further remarks are omitted.

Figure 12:
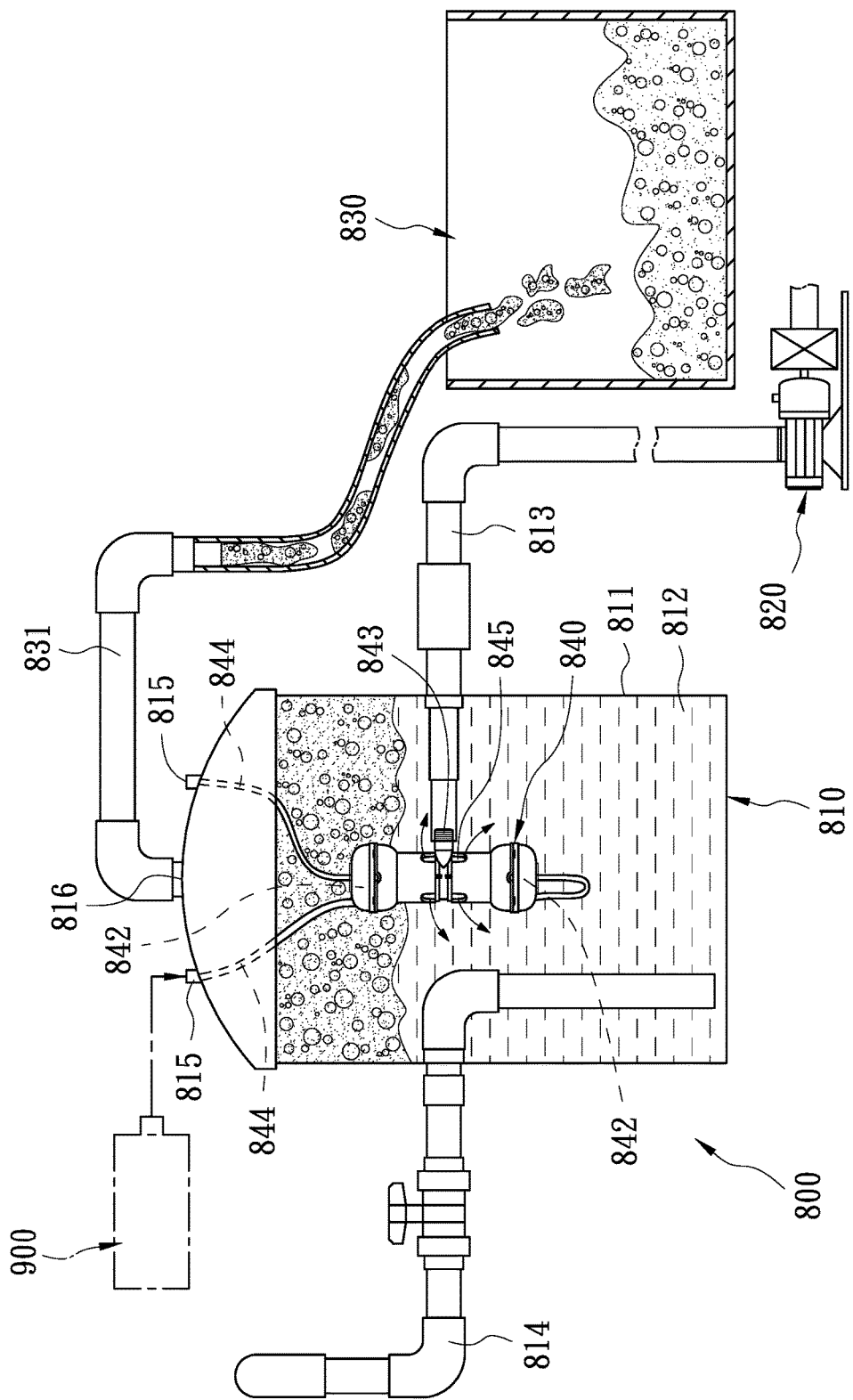
FIG. 12 is a cross sectional showing the assembly of a protein skimmer of the water treatment equipment for recirculating aquaculture according to the second embodiment of the present invention.

Referring to FIGS. 11 and 12, each of the at least one protein skimmer 800 is mounted on a water supply segment of each of the plurality of membrane filtering units 500, and said each protein skimmer 800 includes a cylindrical tank 810, a pump 820, a bubble collection tank 830, and at least one micro bubble generating unit 840.

The cylindrical tank 810 includes a water chamber 812 defined by an inner wall 811, and the cylindrical tank 810 includes an inlet pipe 813 and an outlet pipe 814 which are inserted into the water chamber 812. The cylindrical tank 810 further includes at least one air flowing orifice 815 and a bubble discharging hole 816. In addition, each of the at least one air flowing orifice 815 is connected with an ozone generating unit 900 so as to feed ozone ($O_3$) into the water chamber 812, thus sterilizing bacteria.

The pump 820 is coupled with the inlet pipe 813 so as to pump treated water into the inlet pipe 813 of the cylindrical tank 811 via each of the plurality of membrane filtering units 500.

The bubble collection tank 830 is mounted on one side of the cylindrical tank 811 and includes a collecting tube 831 joined with the bubble discharging hole 816.

Each of the at least one micro bubble generating unit 840 is disposed in the water chamber 812 of the cylindrical tank 810, and said each micro bubble generating unit 840 includes a body 841, a mixing room 842 formed in the body 841, an inlet 843 connecting with the inlet pipe 813 and communicating with the mixing room 842, an air tube 844 coupling with said each air flowing orifice 815 and corresponding to the air tube 844, and a plurality of backflow apertures 845 formed around a peripheral side of the body 841 and communicating with the plurality of backflow apertures 845, respectively. Thereby, when the liquids are pumped into the mixing room 842 via the inlet 843, they are mixed with the air from the air tube 844 so as to generate mixed liquids with micro bubbles, and mucus, baits, excrements, suspended substances in the mixed liquids gather on the micro bubbles and are pushed upwardly via the plurality of backflow apertures 845, thereafter they flow into the bubble collection tank 830 through the collecting tube 831, wherein the mixed liquids separate from the micro bubbles and flow downwardly into each of the at least one aquaculture tank 100 via the outlet pipe 814 of the cylindrical tank 810.

Accordingly, said each protein skimmer 800 is mounted on the water supply segment of said each water circulating tank 400, and said each micro bubble generating unit 840 mixes the liquids and the air together and separates the mixed liquids from the micro bubbles so that mucus, baits, excrements, suspended substances in the mixed liquids are discharged into the bubble collection tank 830 from the bubble discharging hole 816 through the collecting tube 831, and when the micro bubbles float upwardly, the mixed liquids flow back to the liquid bubble separator 100 via the outlet pipe 814, hence the mucus and the ammonia in the mixed liquids are removed so as to recycle the aquaculture water by using said each protein skimmer 800. Furthermore, after ammonia and nitrogen in treated aquaculture water reduce, survival rate of fishes increases.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. Water treatment equipment for recirculating aquaculture comprising:
   at least one aquaculture tank, each being removable and including plural connecting plate units connected together to form an octagonal hollow tank, and each aquaculture tank also including a flowing cup;
   at least one water circulating tank, each being removable and disposed on a first side of each aquaculture tank proximate to the flowing cup, and each water circulating tank including an accommodating chamber;
   a plurality of membrane filtering units arranged in the accommodating chamber, and each membrane filtering unit being a circularly flat membrane and including a water pipe and plural disc-shaped film bags tightly inserted on the water pipe, wherein each film bag has two filtering films communicating with the water pipe; and
   a protein skimmer mounted on a water supply segment of each of the plurality of membrane filtering units, the protein skimmer including a cylindrical tank, a pump, a bubble collection tank, and at least one micro bubble generating unit;
   wherein the cylindrical tank includes a water chamber defined by an inner wall, and the cylindrical tank includes an inlet pipe and an outlet pipe which are inserted into the water chamber, the cylindrical tank further includes at least one air flowing orifice and a bubble discharging hole;
   wherein the pump is coupled with the inlet pipe so as to pump treated water into the inlet pipe of the cylindrical tank via each of the plurality of membrane filtering units;
   wherein the bubble collection tank is mounted on one side of the cylindrical tank and includes a collecting tube joined with the bubble discharging hole;
   wherein each of the at least one micro bubble generating unit is disposed in the water chamber of the cylindrical tank, and said each micro bubble generating unit includes a body, a mixing room formed in the body, an inlet connecting with the inlet pipe and communicating with the mixing room, an air tube coupling with said each air flowing orifice and corresponding to the air tube, and a plurality of backflow apertures formed around a peripheral side of the body and communicating with the plurality of backflow apertures, respectively;
   wherein when liquids are pumped into the mixing room via the inlet, the liquids are mixed with air from the air tube so as to generate mixed liquids with micro bubbles, and mucus, baits, excrements, suspended substances in the mixed liquids gather on the micro bubbles and are pushed upwardly via the plurality of backflow apertures, thereafter the mucus, the baits, the excrements, and the suspended substances flow into the bubble collection tank through the collecting tube, wherein the mixed liquids separate from the micro bubbles and flow downwardly into each of the at least one aquaculture tank via the outlet pipe of the cylindrical tank.

* * * * *